United States Patent
Smith et al.

(10) Patent No.: US 9,156,435 B2
(45) Date of Patent: Oct. 13, 2015

(54) WEBBING ADJUSTER FOR A SEAT BELT ASSEMBLY

(75) Inventors: Paul Michael Smith, Davison, MI (US); Patrick Ramone Akoma, Saginaw, MI (US); Thomas Grzybowski, Fraser, MI (US)

(73) Assignee: TK HOLDINGS INC., Auburn Hills, MI (US)

(*) Notice: Subject to any disclaimer, the term of this patent is extended or adjusted under 35 U.S.C. 154(b) by 663 days.

(21) Appl. No.: 13/458,655

(22) Filed: Apr. 27, 2012

(65) Prior Publication Data

US 2012/0274120 A1 Nov. 1, 2012

Related U.S. Application Data

(60) Provisional application No. 61/481,010, filed on Apr. 29, 2011.

(51) Int. Cl.
 B60R 22/19 (2006.01)
 B60R 22/02 (2006.01)
 B60N 2/68 (2006.01)
 B60N 2/24 (2006.01)
 B60R 22/20 (2006.01)
 B60R 22/18 (2006.01)

(52) U.S. Cl.
 CPC ............. *B60R 22/19* (2013.01); *B60N 2/242* (2013.01); *B60N 2/686* (2013.01); *B60N 2/688* (2013.01); *B60R 22/024* (2013.01); *B60R 22/20* (2013.01); *B60R 2022/1818* (2013.01)

(58) Field of Classification Search
 CPC .............. B60R 22/024; B60R 2022/1818; B60R 22/19; B60R 22/201; B60R 22/20; A44B 11/065; B60N 2002/2815; B60N 2/242; B60N 2/686; B60N 2/688
 USPC ........... 280/802, 804, 806; 297/468, 469, 483
 See application file for complete search history.

(56) References Cited

U.S. PATENT DOCUMENTS

| | | | | | |
|---|---|---|---|---|---|
| 3,293,713 | A | * | 12/1966 | Gaylord | 24/196 |
| 3,486,792 | A | * | 12/1969 | Stoffel | 297/479 |
| 3,713,506 | A | * | 1/1973 | Lipschutz | 180/268 |
| 3,717,216 | A | * | 2/1973 | Rothschild | 180/270 |
| 3,728,764 | A | * | 4/1973 | Carter | 24/642 |
| 4,243,266 | A | * | 1/1981 | Anderson | 297/483 |
| 4,682,791 | A | * | 7/1987 | Ernst | 280/806 |
| 4,726,625 | A | * | 2/1988 | Bougher | 297/483 |
| 4,800,629 | A | * | 1/1989 | Ikeda | 24/170 |
| 5,316,339 | A | * | 5/1994 | Lorenz | 280/806 |
| 5,340,198 | A | * | 8/1994 | Murphy et al. | 297/483 |
| 5,411,292 | A | * | 5/1995 | Collins et al. | 280/806 |
| 5,507,422 | A | * | 4/1996 | Shields | 224/264 |

(Continued)

*Primary Examiner* — Joshua J Michener
*Assistant Examiner* — Matthew Gitlin
(74) *Attorney, Agent, or Firm* — Gordon & Rees LLP

(57) ABSTRACT

A webbing adjuster for a seat belt system having a webbing, the webbing adjuster including a main body having a base and a guide portion configured to limit a forward movement of the webbing relative to the base, the base having a friction element and a passage configured to route the webbing from a front side to a rear side of the base, and a lower guide member connected to the main body and configured to limit the forward movement of the webbing. When the webbing is not under load, the webbing adjuster is configured to be moveable relative to the webbing. When the webbing is under load, the friction element is configured to secure the webbing to maintain a relative position between the webbing adjuster and the webbing.

19 Claims, 6 Drawing Sheets

(56) References Cited

U.S. PATENT DOCUMENTS

| | | | |
|---|---|---|---|
| 5,609,367 A * | 3/1997 | Eusebi et al. | 280/808 |
| 5,733,004 A * | 3/1998 | Celestina-Krevh et al. | 297/250.1 |
| 5,774,947 A * | 7/1998 | Anscher | 24/200 |
| 7,010,836 B2 * | 3/2006 | Acton et al. | 24/265 BC |
| 7,325,835 B2 * | 2/2008 | Janz | 280/801.1 |
| 7,334,301 B2 * | 2/2008 | Huang et al. | 24/170 |
| 7,404,239 B1 * | 7/2008 | Walton et al. | 24/193 |
| 8,002,358 B2 | 8/2011 | Marriott et al. | |
| D647,819 S * | 11/2011 | Kolasa | D11/218 |
| 8,177,025 B2 * | 5/2012 | Lang et al. | 182/3 |
| 8,327,507 B2 * | 12/2012 | Eisinger | 24/170 |
| 8,408,656 B2 * | 4/2013 | Carpenter | 297/468 |
| 2007/0022577 A1 * | 2/2007 | Funo | 24/196 |
| 2007/0114768 A1 * | 5/2007 | Lennir | 280/735 |
| 2008/0030013 A1 * | 2/2008 | Burghardt | 280/808 |
| 2008/0122214 A1 * | 5/2008 | Bell et al. | 280/801.1 |
| 2009/0261566 A1 | 10/2009 | Pelliccia et al. | |
| 2014/0015301 A1 * | 1/2014 | Perlman et al. | 297/468 |

* cited by examiner

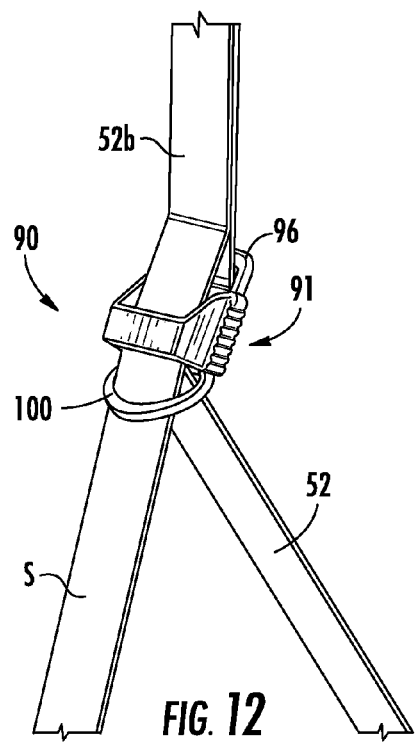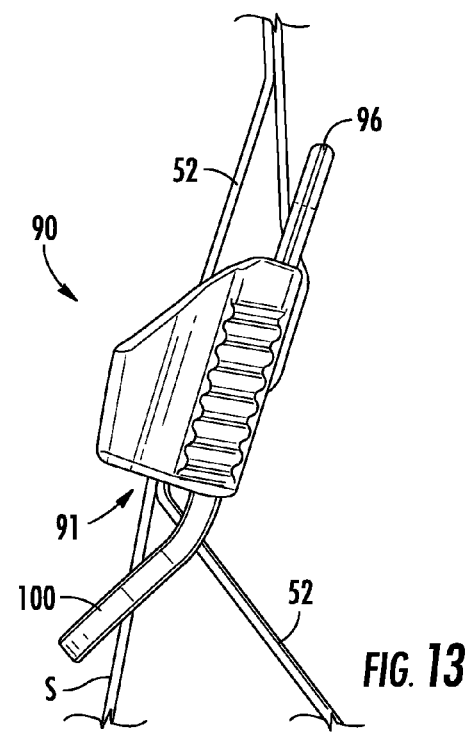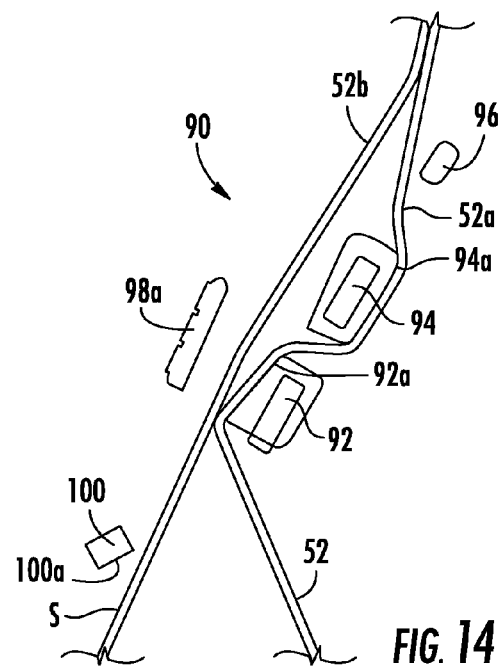

ial Patent Application 61/481,010, filed Apr. 29,
WEBBING ADJUSTER FOR A SEAT BELT ASSEMBLY

CROSS-REFERENCE TO RELATED PATENT APPLICATIONS

This application claims the benefit and priority to U.S. Provisional Patent Application 61/481,010, filed Apr. 29, 2011. U.S. Provisional Patent Application 61/481,010 is incorporated by reference herein in its entirety.

BACKGROUND

The present application relates to the field of seat belt systems (e.g., occupant restraint devices) configured for use with vehicles. More specifically, the present application relates to seat belt systems for vehicle seats having an improved moveable webbing adjuster to accommodate different sizes of occupants.

SUMMARY

One embodiment relates to a webbing adjuster for a seat belt system having a webbing. The webbing adjuster includes a main body and a lower guide member. The main body includes a base and a guide portion configured to limit a forward movement of the webbing relative to the base, the base having a friction element and a passage configured to route the webbing from a front side to a rear side of the base. The lower guide member is connected to the main body and configured to limit the forward movement of the webbing. When the webbing is not under load, the webbing adjuster is configured to be moveable relative to the webbing. When the webbing is under load, the friction element is configured to secure the webbing to maintain a relative position between the webbing adjuster and the webbing.

Another embodiment relates to a seat belt assembly for restraining an occupant of a vehicle. The seat belt assembly includes a webbing and a webbing adjuster coupled only to the webbing. The webbing adjuster includes a main body and a lower guide member. The main body has a base and a guide portion configured to limit a forward movement of the webbing relative to the base, the base having a friction element and a passage configured to route the webbing from a front side to a rear side of the base. The lower guide member is connected to the main body and configured to limit the forward movement of the webbing. When the webbing is not under load, the webbing adjuster is configured to be moveable relative to the webbing. When the webbing is under load, the friction element is configured to secure the webbing to maintain a relative position between the webbing adjuster and the webbing.

BRIEF DESCRIPTION OF THE DRAWINGS

FIG. 12 is a perspective view of the webbing adjuster of FIG. 6 shown with a webbing routed through the webbing adjuster and in an active position or loaded condition.

FIG. 13 is a side view of the webbing and the webbing adjuster of FIG. 12.

FIG. 14 is a cross-sectional view of the webbing and the webbing adjuster of FIG. 13 in an active position.

DETAILED DESCRIPTION

Referring generally to the Figures, disclosed herein are seat belt systems, configured for use in vehicles, such as mass transit vehicles, to restrain and secure occupants of the vehicle. The seat belt assemblies include a webbing and a webbing adjuster slideably coupled to the webbing. The webbing adjusters are configured to be selectively moveable relative to a webbing to accommodate different sized (e.g., height) occupants. For example, the webbing adjusters may be moved or adjusted relative to a seat belt or webbing to raise or lower the webbing adjuster relative to a shoulder of the occupant. The webbing adjuster may include a body, which may define a passage for the webbing to route therethrough. The webbing adjuster may include a guide element to help guide the webbing. For example, the webbing adjuster may include three guide elements provided at different locations to help guide the webbing routed through the webbing adjuster. The body may include a guide element. The body may include a member configured to support the webbing. For example, the body may include a first member having a first friction element and a second member having a second friction element, where the first and second members support the webbing at different locations. The members may be spaced apart to allow the webbing to route between the members. When a threshold load is applied to the webbing, such as during a vehicle dynamic event that induces the occupant to load the webbing, the webbing adjuster is configured to selectively secure the webbing to maintain a relative position between the webbing adjuster and the webbing.

A vehicle (e.g., a passenger vehicle) includes a seat assembly, such as seat assembly 10, to provide seating to one or more occupants and to absorb energy during a dynamic vehicle event, such as a crash or other sudden acceleration/deceleration. A mass transit vehicle, such as a bus, includes a plurality of seat assemblies 10 that are configured to absorb energy during a dynamic vehicle event. Components of the seat assembly 10 work cooperatively, such that the seat assembly 10 may bend or deflect according to the various Federal Motor Vehicle Safety Standards. More particularly, FMVSS 222 includes quasi-static testing that provides force, displacement, and energy absorption requirements for a sequence of forward forces applied to the rear of the seat back, forward forces applied through the seatbelts, and rearward forces applied to the front of the seat back. Quasi-static testing is generally used to simulate dynamic loading of the seat assembly, such as through a static test arrangement of the seat assembly utilizing progressive loading of the seat assembly. The seat assembly may instead or additionally be configured to conform other standards, such as FMVSS 207 and 210, or may be configured according to other requirements, such as for other jurisdictions or other applications.

Figure 1:
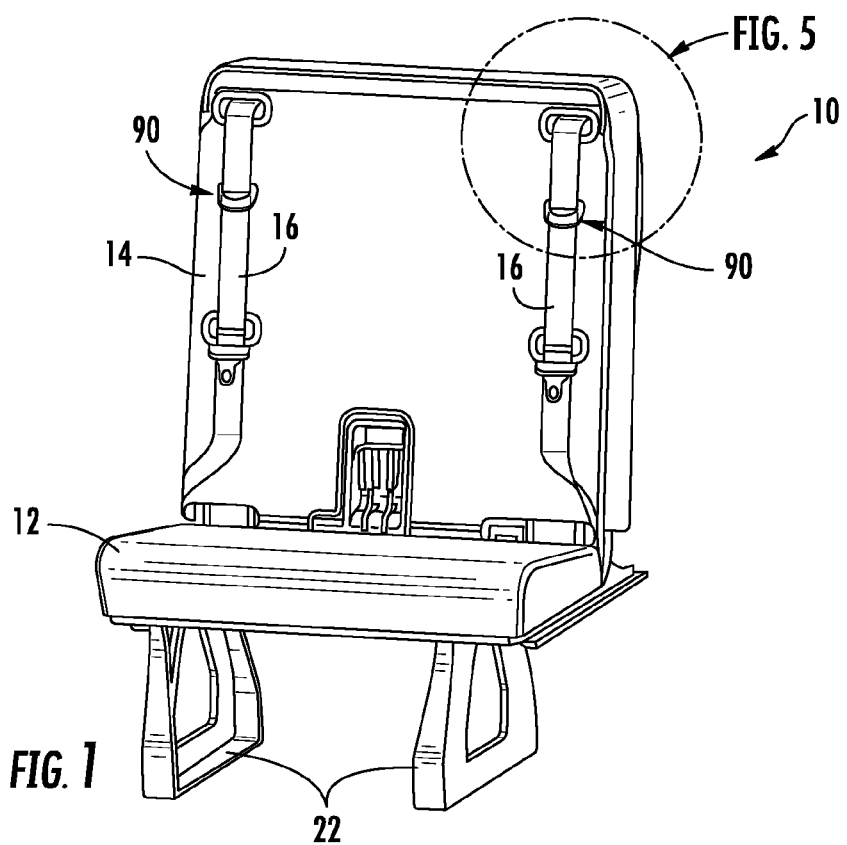
FIG. 1 is a perspective view of a seat assembly according to an exemplary embodiment.

FIG. 1 illustrates an exemplary embodiment of a seat assembly 10 including a seat bottom 12, seat back 14, and a seat belt assembly 16 configured to secure and restrain a seated occupant (not shown). The seat assembly 10 may include more than one seat belt assembly 16 and generally includes the number of seat belt assemblies equal to the seating capacity of the seat. For example, the seat assembly 10 having a seating capacity of two occupants may include two seat belt assemblies 16, each seat belt assembly 16 configured to secure one occupant. Also for example, a seat assembly 10 may include a pair of outer seat belt assemblies 16 configured to secure two outboard occupants and a center seat belt assembly 18 configured to secure a center occupant provided between the two outboard occupants, as shown in FIG. 3.

Figure 2:
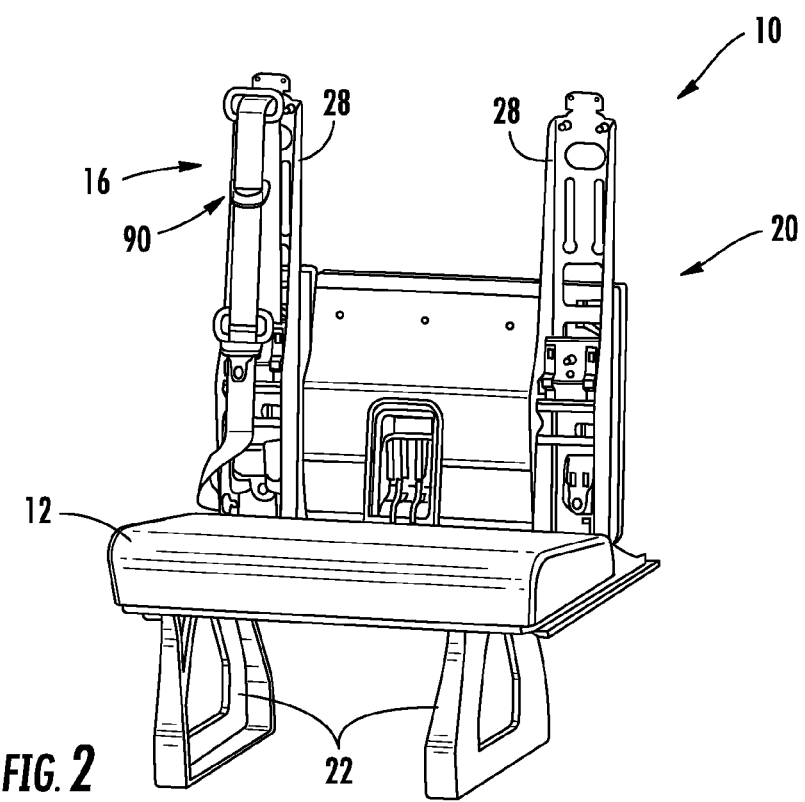
FIG. 2 is a perspective view of part of the seat assembly of FIG. 1.

As shown in FIG. 2, seat assembly 10 also includes a seat frame 20 or seat structure configured to provide the structurally integrity (e.g., strength, durability, etc.) of the seat assembly 10. In other words, the seat frame 20 is configured to manage the loads, such as during a dynamic vehicle impact of the vehicle (or a quasi-static test). The seat frame 20 may manage the loads by absorbing energy during loading of the seat assembly 10. The loading of the seat assembly 10 may be caused by the forces generated by the seat belt system 16 restraining the secured occupant during a sudden deceleration or impact by the vehicle, particularly when the seat belt system 16 is coupled to the seat assembly 10.

Figure 3:
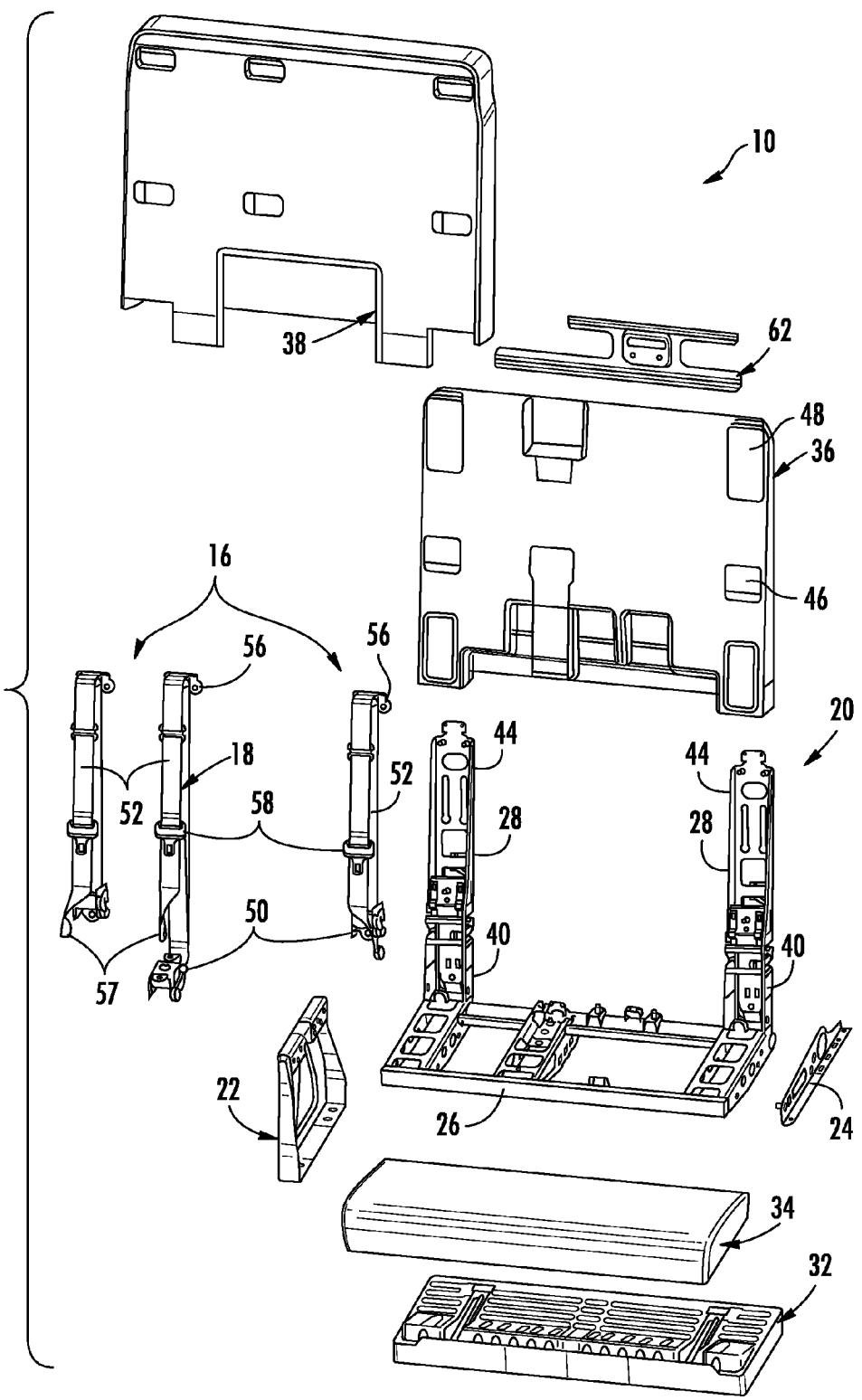
FIG. 3 is a partially exploded perspective view of another exemplary embodiment of a seat assembly.

FIG. 3 illustrates the seat frame 20 of seat assembly 10 in an exploded view for clarity. In addition to providing the structure for the seat assembly 10, the seat frame 20 also generally defines the shape (e.g., outline, profile, etc.) of the seat assembly 10, such as the seat bottom 12 and the seat back 14. As shown, each of the seat belt assemblies 16, 18 is configured to attach to the seat frame 20 to restrain a passenger secured in the seat assembly 10 by the seat belt assembly 16, 18 during a dynamic vehicle event.

The seat frame 20 of the seat assembly 10 includes a back frame and a frame bottom 26. The seat frame 20 may also include a pedestal 22 (e.g., a riser) and/or a mounting bracket 24. The back frame may include a beam 28 (e.g., tower, support, etc.). As shown in FIG. 3, the back frame includes two generally vertical beams 28 and a back panel 36. The pedestal 22, the mounting bracket 24, the frame bottom 26, and the back frame (e.g., the beams 28) may each be made of a rigid material (e.g., steel, other metal, composite, plastic, combinations, thereof, etc.) and are interconnected or coupled together through any suitable assembly process (e.g., by welding, adhesives, fasteners, integral formation, combinations thereof, etc.), so as to generally define the shape of the seat bottom 12 and the seat back 14. According to other exemplary embodiments, frame components may be made from other materials (e.g., other metals, composites, plastics, combinations thereof, etc.), may be made according to other manufacturing methods (e.g., rolling, extrusions, molding, etc), may be coupled together in different manners (e.g., adhesives, fasteners, press- or tolerance-fit, combinations thereof, etc.), and the like. It should be noted that the seat frame may include any number of structural members interconnected using any suitable assembly process or method, and the embodiments disclosed herein are not limiting.

The pedestal 22 and mounting bracket 24 are configured to elevate the seat bottom 12 and seat back 14 above a bottom surface of the bus, such as a floor. The pedestal 22 and mounting bracket 24 are each configured to rigidly mount the seat assembly 10 to the mounting surface of the bus. For example, the seat assembly 10 may be rigidly attached to the floor (not shown) through the pedestal 22 and/or rigidly attached to a wall (not shown) of the vehicle through the mounting bracket 24. The pedestal 22 and mounting bracket 24 may, for example, be coupled to the bus by any suitable method, which may include, for example, welding, fasteners, and mechanisms, which may be releasable mechanisms, not releasable mechanisms, removable mechanisms, etc. For example, the seat assembly 10 may be configured to be selectively removable from the vehicle through floor latch mechanisms, which may engage strikers in the floor of the vehicle. According to other exemplary embodiments, the seat assembly 10 may be mounted to the bus in other manners. For example, the frame 20 may include two spaced-apart pedestals 22 with each pedestal 22 being provided on one of two opposing sides of the seat assembly 10, such as using fasteners, another bracket, or any manner suitably adapted for a particular vehicle or application.

The seat assembly 10 may also include a bottom panel 32 and/or a cover 34 (e.g., a trim cover, covering, etc.). For example, the frame bottom 26, the bottom panel 32, and cover 34 may cooperatively define the shape of the seat bottom 12, which is configured to support one or more passengers thereon. The cover 34 may include an outer fabric layer disposed around an inner cushioned layer (e.g., a cushion), such as an inner foam layer. The outer fabric layer of the cover 34 may provide improved aesthetics and the cushion may provide cushioned support for the seated occupants. Thus, the frame bottom 26 provides the structure for supporting the passengers, while the bottom panel 32 is coupled to the frame bottom 26 and provides a surface for supporting the cover 34 that the passengers are seated on. The cushion and/or cover 34 may have any suitable shape and/or arrangement, such as being tailored to provide comfort for the seated occupants or passengers.

Figure 4:
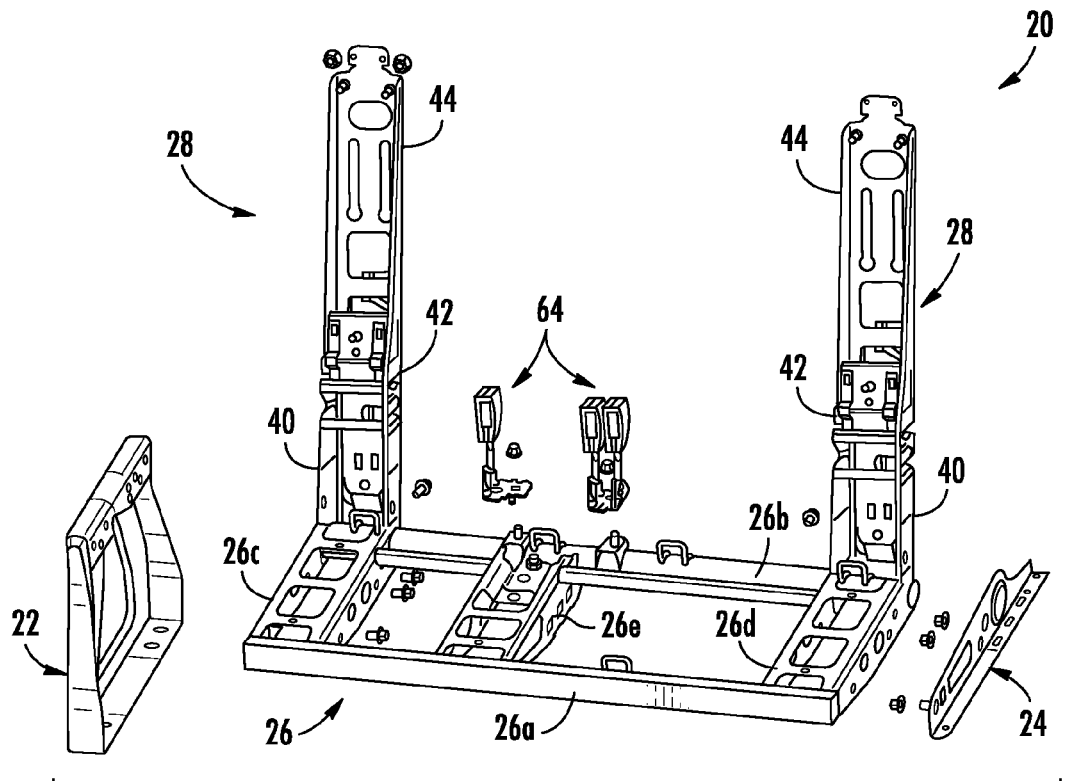
FIG. 4 is a partially exploded perspective view of part of the seat assembly of FIG. 3.

The frame bottom 26 is disposed above and is rigidly coupled to the pedestal 22, such as by welding, fasteners, or a combination thereof. The frame bottom 26 of the frame 20 may include one member or a plurality of interconnected members. As shown in FIG. 4, the frame bottom 26 includes a front cross-member 26a (e.g., front sideward-extending member), a rear cross-member 26b (e.g., rear sideward-extending member) and left-side member 26c (e.g., left forward-extending member), a right-side member 26d (e.g., right forward-extending member), and a center member 26e (e.g., a middle forward-extending member). The members 26a-26e may have any suitable shape, such as tubular, and may have any suitable cross-section, such as C-shaped, U-shaped, or L-shaped. The members 26a-26e of the frame bottom 26 may be coupled together, such as through welding (e.g., MIG, TIG, laser, etc.) to form a generally horizontal seat structure or support. It should be noted that the frame bottom 26 may include more or fewer members and may include other structural elements, such as support member or additional cross-members, and the embodiments disclosed herein are not limiting. Further, the frame bottom 26 may be coupled to the pedestal 22 in different manners (e.g., fasteners, press- or tolerance-fit, integral formation, etc.), or any suitable combinations thereof.

The seat assembly 10 may also include a back cover 38 (e.g., a trim cover, covering, etc.). The back cover 38 may include an outer fabric layer disposed around an inner cushioned layer (e.g., a cushion), such as an inner foam layer. For example, the back cover 38 together with the beams 28 and the back panel 36 of the back frame may cooperatively define the shape of the seat back 14, which is configured to support the backs of one or more passengers. The seat back 14 may also define passenger compartments in front of and behind the seat back 14. The beams 28 provide the structure for supporting the passengers, while the back panel 36 provides a surface that supports the back cover 38 against which the passengers may lean. The cushion and/or cover 34 may have any suitable shape and/or arrangement, such as being tailored to provide comfort for the seated occupants or passengers.

Also shown in FIG. 3, the beams 28 are elongated stamped steel members having a generally U-shaped cross-section. Each beam 28 includes a lower end 40 (e.g., lower portion), a middle portion 42 (e.g., intermediate portion, central portion, etc.), and an upper end 44 (e.g., upper portion). As shown, the lower ends 40 of the beams 28 are rigidly coupled to opposite ends of the frame bottom 26 in a manner that prevents relative rotation between lower ends 40 of the beams 28 and the frame bottom 26 (e.g., by welding). However, it should be noted that the lower ends 40 may be connected to the frame bottom 26 through a mechanism (e.g., recliner) to provide an adjustable seat back 14 relative to the seat bottom 12. The middle portions 42 of the beams 28 may be configured for energy absorption. The upper ends 44 of the beams 28 are configured to provide an upper harness point (e.g., an attachment) for the seat belt assemblies 16. According to other exemplary embodiments, the beams 28 may be made from different materials (e.g., other metals, composites, plastics, etc.), may be made according to different manufacturing processes (e.g., stamping, rolling, molding, etc.), may have different geometry (e.g., tubular, solid, different cross-section shape, varying geometry, etc.), and the like in suitable combinations for the seat assembly 10 described herein.

The back panel 36 may be a blow molded unitary plastic member or piece having receptacles disposed at opposite ends of a panel portion. Each receptacle is a generally vertical, hollow chamber having a bottom opening configured to receive one of the beams 28 therein. The receptacles have a shape and size that corresponds with the cross-sectional shape and size of the beams 28. The back panel 26 may also include a middle opening 46 and an upper opening 48 through which seat belt webbing may pass. For example, the openings 46, 48 may pass from a front surface of the back panel 26 to the receptacles.

The back panel 36 may be coupled to the beams 28, such as at the upper ends 44, through any suitable method, such as using fasteners (e.g., rivets, bolts, etc.), so as to prevent relative motion between the back panel 36 and beams 28 and to impart structural rigidity between the beams 28 and back panel 36. The back panel 36 defines a generally flat forward surface to support the back cover 38 against which a passenger may lean or rest. The back panel 36 may also include various structural features, such as ribs, of varying size and shape to provide the back panel 36 with structural integrity independent of the beams 28 to support passengers.

Each seat assembly (e.g., the seat assembly 10) may include one or more than one seat belt assembly (e.g., the seat belt assembly 16, the seat belt assembly 18) configured to restrain a passenger or occupant of the vehicle, such as to transfer energy and loads from the passenger to the seat assembly during a dynamic vehicle event. As shown in FIG. 1, the seat assembly 10 includes a pair of seat belt assemblies 16 configured to restrain up to two seated passengers. As shown in FIG. 3, the seat assembly 10 may include two outboard seat belt assemblies 16 and one inboard seat belt assembly 18 configured to restrain up to three seated passengers. Each seat belt assembly 16, 18 forms a three-point harness configured to restrain a passenger in the seat assembly 10 during a dynamic vehicle event, such as a crash or sudden vehicle deceleration.

According to an exemplary embodiment, the seat belt assembly 16 includes a webbing 52, a tongue member 58 slideably attached to the webbing 52, a buckle mechanism 64 (e.g., latch mechanism) configured to selectively receive and retain (e.g., lock) the tongue member 58, and a webbing adjuster 90. According to other exemplary embodiments, each seat belt assembly 16, 18 may include a webbing 52, a retractor 50 (e.g., a retractor mechanism), a buckle mechanism 64 (e.g., a latch mechanism), a tongue member 58 that is configured to selectively engage the buckle mechanism 64, an upper bracket 56 to help guide the webbing 52, a lower anchor member 57 to secure an end of the webbing 52, and a webbing adjuster 90 configured to be adjustable relative to the webbing 52.

The webbing 52 of the seat belt assembly 16, 18 includes a first end 53 and a second end 54. As shown in FIG. 3, the first end 53 of the webbing 52 is coupled to the retractor 50 (e.g., retractor mechanism), which may be fixed or connected to the seat frame 20 (e.g., beam 28, frame bottom 26, or pedestal 22). For example, the first end 53 may be coupled to a rotatable spool of the retractor 50, such that the webbing 52 may be wound/unwound from the spool to allow retraction/extraction of the webbing 52 from the retractor 50. Thus, the retractor 50 provides for selective storage and release of the webbing 52 depending on whether a passenger is seated or moving into or out of the seat assembly 10. The refractor 50 also functions to lock or hold the webbing 52 in tension against the passenger (i.e., to prevent extraction of the webbing) to prevent further release of the webbing 52 during a dynamic vehicle event. The retractor 50 may also be configured to pretension the webbing 52 during a dynamic vehicle event by retracting a portion of the webbing 52 into the refractor 50 to remove slack or clearance between the secured occupant and the webbing 52, such as to limit the movement (e.g., displacement) of the occupant.

Each refractor 50 is rigidly coupled to a lower portion of the seat frame 20, such as with the use of fasteners, and is covered by another seat component, such as the seat back panel 36 and/or seat back cover 38. For example, each retractor 50 for each outboard seat belt assembly 16 may be coupled to the lower end 40 of one of the beams 28 and may be partially disposed in the U-Shaped channel of the beam 28. Also for example, the retractor 50 for the inboard seat belt assembly 18 may be coupled to the frame 20 or pedestal 22, such as to the rear cross-member 26b. According to other exemplary embodiments, the retractor mechanisms may be coupled to any other suitable elements or portions of the frame 20, or may be coupled to any suitable rigid attachment location in the vehicle (e.g., bus).

Figure 5:
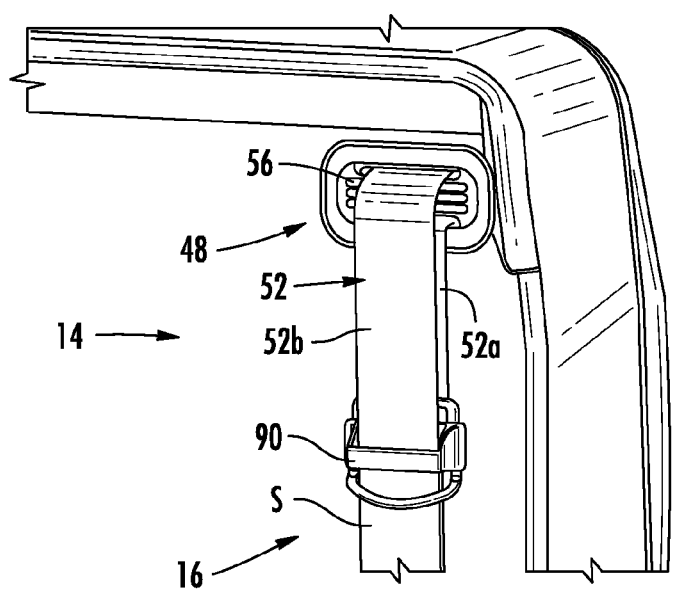
FIG. 5 is a detail view of part of the seat assembly of FIG. 1.
Figure 6:
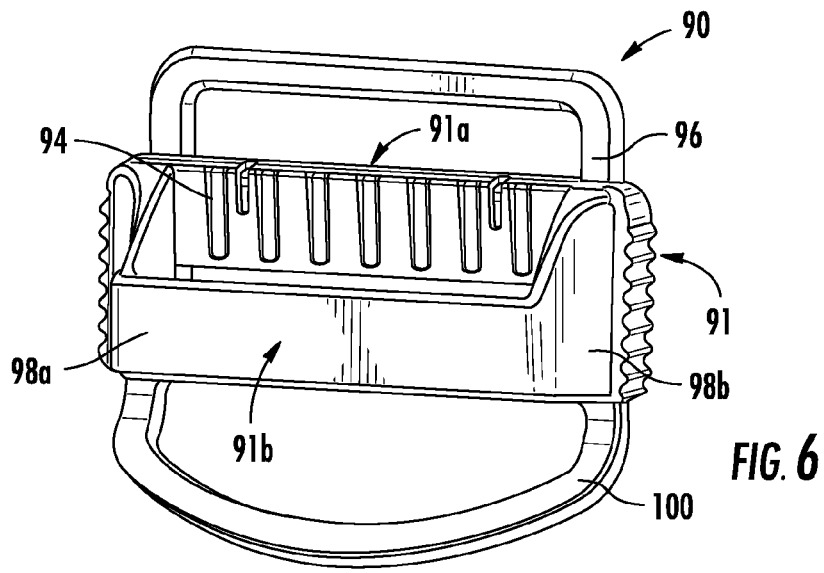
FIG. 6 is a front perspective view of a webbing adjuster according to an exemplary embodiment.
Figure 7:
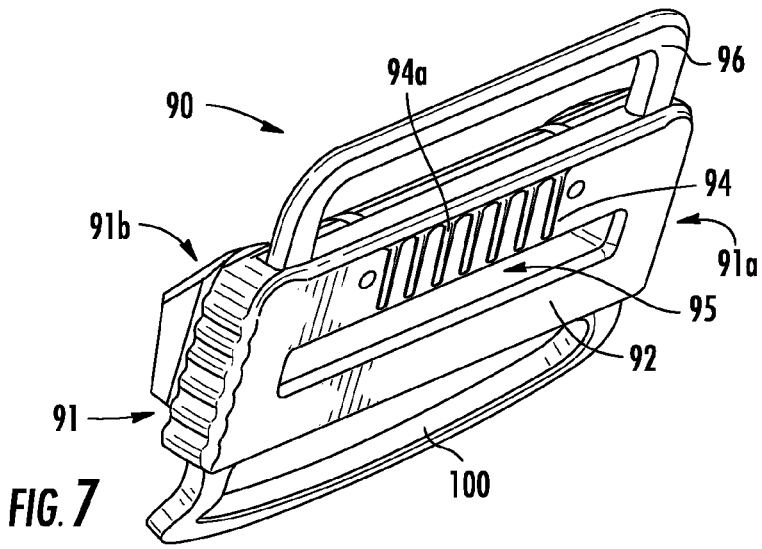
FIG. 7 is rear perspective view of the webbing adjuster of FIG. 6.
Figure 8:
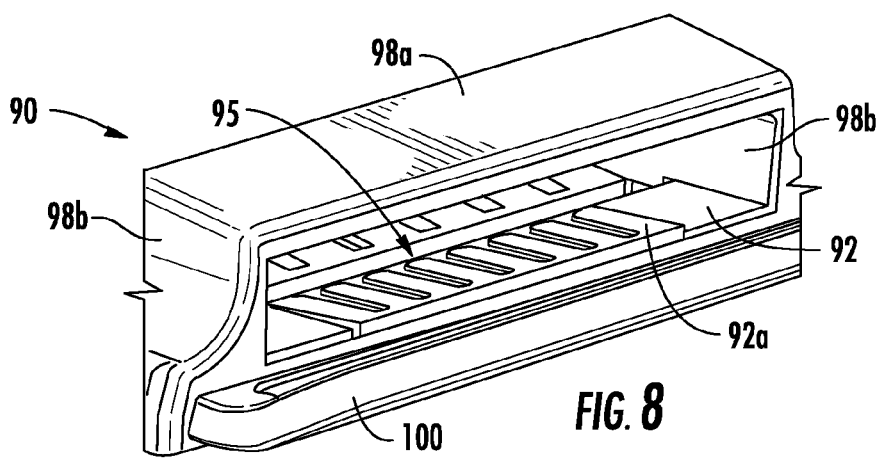
FIG. 8 is a bottom perspective view of the webbing adjuster of FIG. 6.

As shown in FIG. 3, the webbing 52 extends upward from the refractor 50 and is configured to route through the middle or intermediate opening 46 of the seat back panel 36 and/or seat back cover 38, so as to be exposed or external to the seat back 14. As shown in FIG. 5, the webbing 52 then extends or routes back through the upper opening 48 of the seat back panel 36 and an upper bracket 56 that is rigidly coupled to the upper end 44 (e.g., upper portion) of the beam 28. The upper bracket 56 forms or defines an upper or shoulder harness attachment location/point for the webbing of the seat belt assembly 16. The portion of the webbing 52 that is routed back out of the upper bracket 56 is configured to receive the webbing adjuster 90 to define a shoulder portion S of the webbing 52 which then routes over the shoulder and torso of the occupant. For the inboard seat belt assemblies 18, the upper bracket 56 may, for example, be coupled to a rigid anchor plate or panel 62 that is configured to be coupled to a middle or upper portion on the rear surface of the seat back panel 36.

The second end 54 of the webbing 52 may be fixed relative to the seat belt assembly 16, 18. For example, the second end 54 may be fixedly coupled to the seat frame 20 (e.g., beam 28, frame bottom 26, or pedestal 22) by way of a fastener, such as a bolt and a nut, or by any other suitable fastening means or connecting method.

The tongue member 58 is configured to slide along the webbing 52 and to selectively (e.g., releasably or disengageably) couple to the buckle mechanism 64, which may be fixed to the seat frame 20 (e.g., frame bottom 26 or pedestal 22). The tongue member 58 divides the webbing into the shoulder portion S and a lap portion that is configured to route over the lap of the secured passenger. Thus, the tongue member 58 is slideably coupled to the webbing 52 to provide for comfort adjustment by allowing the secured passenger to slide the tongue member 58 along the webbing 52 to adjust the length of the lap portion and the length of the shoulder portion S of the webbing 52. The tongue member 58 and the buckle mechanism 64 may have any suitable configuration. One buckle mechanism 64 may be provided for each seat belt assembly 16, 18. Alternatively, additional and redundant buckle mechanisms 64 may be provided to provide various seating arrangements to accommodate different passenger configurations.

The webbing adjuster 90 of the seat belt assembly 16, 18 is configured to adjust the position of the seat belt webbing 52 that extends from the upper bracket 56 to the tongue member 58 and/or buckle mechanism 64 to accommodate passengers of different size. For example, by lowering or raising the webbing adjuster, the shoulder portion of the webbing may be adjusted to begin near to (e.g., above) the passenger's shoulder. In other words, the webbing adjuster 90 is slideably attached to the webbing 52 relative to the fixed upper bracket 56 (and other stationary seat components) to allow the passenger to adjust the length of the shoulder portion S of the webbing 52. Accordingly, each passenger can adjust the shoulder portion S for comfort by moving the webbing adjuster 90 along the webbing 52 either away from or toward the upper bracket 56. The webbing adjuster 90 is also configured to maintain or lock the webbing in position during a dynamic vehicle event and during testing. In other words, during a dynamic vehicle event, the webbing adjuster 90 is configured to prohibit relative movement between the webbing adjuster 90 and the webbing 52.

According to an exemplary embodiment, the webbing adjuster 90 is a unitary, molded (e.g., injection molded) piece having various members, portions, elements and/or ribs that are integrally formed together. According to another exemplary embodiment, the webbing adjuster 90 is made from several separate components, which are then coupled together.

As shown in FIGS. 6-9, the webbing adjuster 90 includes a main body 91 having a base 91a and a guide portion 91b configured to limit a forward movement of the webbing routed through the main body 91 relative to the base 91a. The base 91a and guide portion 91b may be integrally formed together or may be formed separately and coupled together. The webbing adjuster 90 may also include one or more than one guide member. As shown, the webbing adjuster 90 includes an upper guide member 96 and a lower guide member 100.

The base 91a of the main body 91 may have any suitable shape or configuration, such as, for example, being generally planar. The base 91a includes a passage 95 configured for the webbing 52 to route or pass therethrough. For example, the passage 95 may be configured to allow the webbing 52 to route from a front side of the base 91a to a rear side of the base 91a. The passage 95 may be transversely configured in the base 91a to route the webbing 52 at an angle, such as, for example, about 90°, relative to the portions of the webbing adjacent to the front and rear sides of the base 91a.

Figure 11:
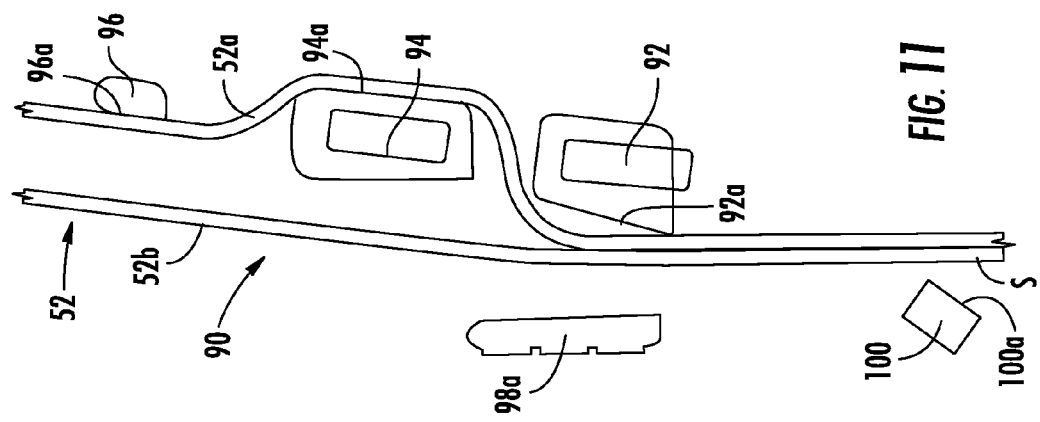
FIG. 11 is a cross-sectional view of the webbing and the webbing adjuster of FIG. 9 in the resting position.

The base 91a of the main body 91 may include a first member 92 and a second member 94, where each member may have any suitable configuration and may be disposed anywhere on the main body 91. For example, the members 92, 94 may have a generally rectangular cross-section with rounded corners (e.g., edges). The members 92, 94 are spaced apart to define the passage 95 to allow the webbing 52 to pass between the members, as shown in FIG. 11, and the spacing may be changed or reconfigured, such as to accommodate different seat belt assembly arrangements. The spacing (i.e., the gap) between the members 92, 94 is at least large enough to permit the webbing 52 to pass through. In other words, the first member 92 is spaced apart from the second member 94 so that the webbing 52 can route between the members 92, 94 through the passage 95.

For example, the first and second members 92, 94 may be configured as opposing rib features. The base 91a (e.g., first and second members 92, 94) may be provided below the upper guide member 96 and may be generally aligned with or offset from the upper guide member 96. The first member 92 may be disposed generally below the second member 94, which may be disposed generally below the upper guide member 96.

The guide portion 91b of the main body 91 may have any suitable configuration, such as having a generally C-shaped cross-section (when viewed from above or below) to define a channel with the base 91a for the webbing 52 to route therethrough. As shown in FIG. 11, the guide portion 91b includes a front wall 98a that is disposed forward of the base 91a and two opposing side walls 98b that interconnect the front wall 98a to the base 91a. The guide portion 91b is configured to guide the webbing and to limit a forward movement of the webbing relative to the base 91a. Thus, the guide portion 91b defines the size of the channel in which the webbing 52 is routed through and also helps retain the webbing 52 in the channel. It should be noted that the guide portion 91b may include additional walls, such as forward walls. Further, the webbing adjuster 90 may also include additional guide portions.

The base 91a of the main body 91 may also include a friction element. The friction element of the base 91a may be configured to help secure the webbing to maintain a relative position between the webbing adjuster 90 and the webbing 52, such as when the webbing 52 is under loading (e.g., induced by the secured occupant during a dynamic vehicle event). The friction element may have any suitable configuration, such as, for example, being a plurality of grooves, a plurality of protrusions, or a combination thereof. The friction element is configured to increase the friction between the webbing 52 and the webbing adjuster 90 during a dynamic vehicle event to prevent relative movement between the webbing 52 and the webbing adjuster 90. In other words, the friction element of the member(s) helps the webbing adjuster 90 lock the webbing 52 in place during a dynamic vehicle event.

The friction element may be provided on one or more than one surface of the base 91a (and/or the guide portion 91b) of the main body 91. For example, each of the first and second members 92, 94 of the base 91a may include a friction element provided thereon. As shown in FIG. 11, a generally forward facing surface 92a of the first member 92 includes a friction element disposed thereon, and a generally rearward facing surface 94a of the second member 94 includes a friction element disposed thereon. Thus, the friction elements may be provided on the surfaces of the base 91a (e.g., the respective members 92, 94) that are configured to engage or directly contact the webbing 52.

Figure 10:
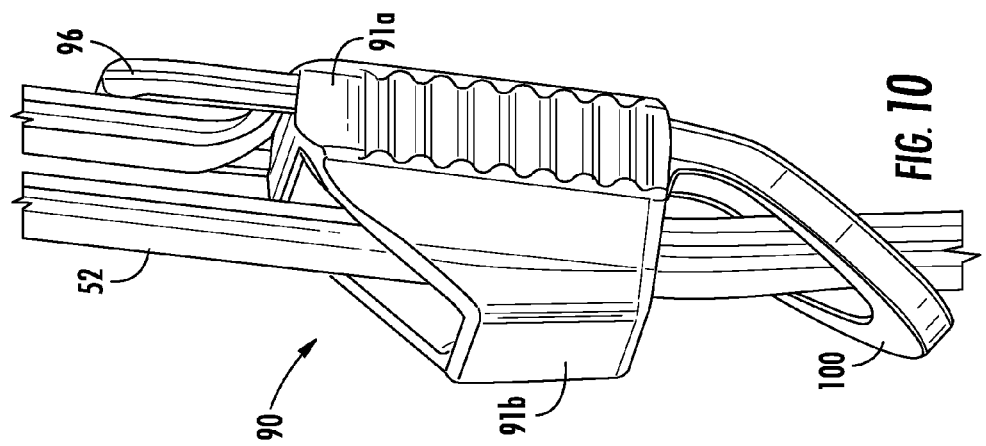
FIG. 10 is a perspective view of the webbing adjuster of FIG. 6 shown with a webbing routed through the webbing adjuster and in a resting position.
Figure 9:
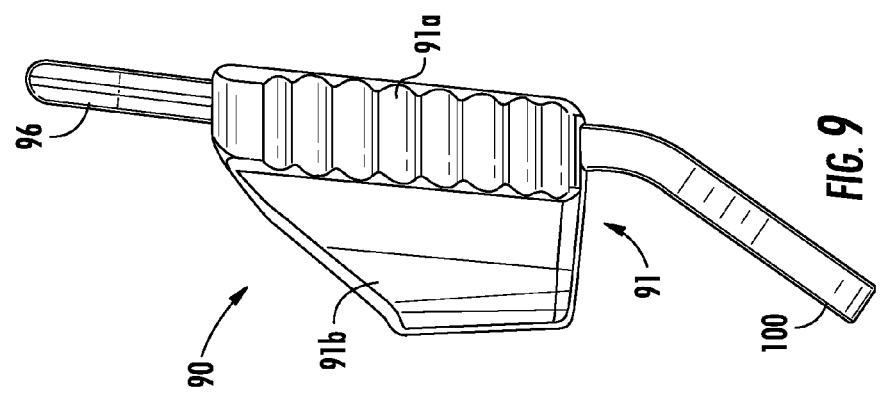
FIG. 9 is a side view of the webbing adjuster of FIG. 6.

The upper guide member 96 may have any suitable configuration, shape, and location. As shown in FIGS. 9-11, the upper guide member 96 is generally configured as a C-shaped member (e.g., a rod) that is connected to the main body 91. The upper guide member 96 may be disposed above the base 91a and generally in line with the first and second members 92, 94 of the base 91a. Accordingly, the upper guide member 96 may be distally located relative to the main body 91 of the webbing adjuster 90. As shown in FIG. 11, the upper guide member 96 is configure to route the webbing from the rear side of the base 91a back to the front side. The upper guide member 96 may limit the movement of the webbing in a rearward direction (e.g., into the seat).

The lower guide member 100 may have any suitable configuration, shape, and location. As shown in FIGS. 9-11, the lower guide member 100 is generally configured as a C-shaped member (e.g., a rod) that is connected to the main body 91. The lower guide member 100 may be disposed generally below or downward of the guide portion 91b (e.g., the front wall 98a) and generally forward and downward from the base 91a (e.g., the first member 92). Accordingly, the lower guide member 100 may be distally located relative to the main body 91 of the webbing adjuster 90. As shown in FIG. 11, the lower guide member 100 is configured to limit the movement of the webbing in a forward direction (e.g., away from the seat). The lower guide member 100 may be configured at an angle, such a forward oblique angle, relative to the base 91a. The angle may advantageously help induce a bind on the webbing to further assist the friction element in securing the webbing in position relative to the webbing adjuster when the webbing is under load or subjected to loading.

The webbing 52 of the seat belt assemblies 16, 18 is woven through the webbing adjuster 90. As shown in FIGS. 5 and 11, the portion 52a of the webbing 52 that extends between the retractor 50 and the upper bracket 56 is routed (e.g., threaded) in front of the first member 92, then behind the second member 94, and then in front of the upper guide member 96. in other words, the webbing adjuster 90 is configured to route the webbing 52 from the front side of the base 91a to the rear side of the base 91a through the passage 95, then the upper guide member 96 routes the webbing 52 back to the front side. Thus, the portion 52a of the webbing 52 may be adjacent to or abutting the forward facing surface 92a of the first member 92 and the rearward facing surface 94a of the second member 94, which may include friction elements disposed thereon. The portion 52a may also be provided adjacent to or abutting a forward facing surface 96a of the upper guide member 96.

The webbing 52 may then extend upwardly away from the webbing adjuster 90 into the upper bracket 56, where the webbing 52 may form a loop around the upper bracket 56, such that a second portion 52b of the webbing 52 exits the upper bracket 56. The second portion 52b may extend from the upper bracket 56 in a substantially downward direction. The second portion 52b of the webbing 52 (e.g., which may extend from the upper bracket 56 to the tongue member 58) is routed (e.g., threaded) back into the webbing adjuster 90 in the channel defined by the base 91a and guide portion 91b of the main body 91 (i.e., in front of the first and second members 92, 94 and behind the front wall 98a of the guide portion 91b). The second portion 52b of the webbing 52 then continues to route or extend downwardly behind the lower guide member 100 and beyond the lower guide member 100 to form the shoulder portion S of the webbing 52.

A passenger may use the webbing adjuster 90 to change the position of the webbing that extends from the upper bracket 56 to the tongue member 58. In other words, the passenger may move (e.g., slide) the webbing adjuster 90 along the webbing 52 to change the height of the webbing adjuster 90 relative to the upper bracket 56 to thereby adjust the length of the shoulder portion S of the webbing 52. Thus, the seat belt assembly 16, 18 may be adjusted for comfort, such as to accommodate the specific height of the passenger. Accordingly, the seat belt assembly 16 may be readjusted to accommodate the different heights of different passengers. By sliding the webbing adjuster 90 generally up or down, the webbing 52 is pulled behind the front wall 98a and is also pulled behind and/or under the lower guide member 100 to effectively change the upper harness position of the seat belt assembly 16, 18. For example, a passenger may position the webbing to be proximate a shoulder region to run below a neck region of the passenger.

The webbing adjuster 90 may be configured to remain relatively stationary relative to the upper bracket 56 during normal operation. In other words, once the passenger has adjusted the position of the webbing adjuster 90 to the preferred comfort position, the webbing adjuster 90 remains relatively fixed in the adjusted position. For example, the friction force between the webbing adjuster 90 and the webbing 52 may overcome the force of the weight of the webbing adjuster 90 allowing the webbing adjuster 90 to maintain its relative adjusted position. The friction elements of the members may help induce the friction force between the webbing adjuster 90 and the webbing 52. Further, the relative routing of the webbing 52 through the webbing adjuster 90 may induce the necessary friction force to maintain the position of the webbing adjuster 90. The level of the friction force is configured to help hold the webbing adjuster 90 in the adjusted position relative to the webbing 52, such as during normal operation of the vehicle, yet the friction force does not hinder or impede the adjustability of the webbing adjuster 90. Thus, the level of the friction force may be tailored to allow the webbing adjuster 90 to be moved relative to the webbing when a threshold force is applied to the webbing adjuster 90.

As shown in FIGS. 12-14, the webbing adjuster 90 is configured to lock the webbing 52 in place during a dynamic vehicle event, such as a crash, or quasi-static testing of FMVSS 222. In other words, the during loading of the webbing 52, such as by the secured passenger, the webbing adjuster 90 is configured to prohibit movement of the webbing adjuster 90 relative to the webbing 52. For example, the tension in the webbing 52 may work in conjunction with the friction elements of the webbing adjuster 90 to induce the webbing adjuster 90 to clamp and lock the webbing 52 into, such as the first portion 52a of the webbing 52 located between the retractor 50 and the upper bracket 56. The retractor 50 may lock the webbing 52, such as by prohibiting rotation of the spool in a webbing extraction direction, whereby the forward momentum of the passenger or testing devices will load the webbing 52 and place the webbing 52 in tension. The forces induced by the tension drive the webbing against the forward facing surface 92a of the first member 92, the rearward facing surface 94a of the second member 94, and/or the forward facing surface 96a of the upper guide member 96. The webbing 52 is also forced against a rearward surface 100a of the distal lower guide member 100 inducing a moment about a central portion of the webbing adjuster 90 causing the webbing adjuster 90 to rotate in a clockwise direction, as shown in FIGS. 11 and 14. The rotation of the webbing adjuster 90 may drive the webbing 52 against the surfaces of the first and second members 92, 94 with higher forces (e.g., pressures) increasing the friction forces between the friction elements of the members 92, 94 and the webbing 52. The friction elements of the first and second members 92, 94 in effect grab or clamp the webbing to lock or fix the webbing adjuster 90 in position relative to the webbing 52 during the course of a dynamic vehicle event or testing. As such, the upper harness position is fixed and the portion 52b of the webbing 52 that extends from the upper bracket 56 to the tongue member 58 and/or buckle mechanism 64 is held in position behind the lower guide member 100. Stated differently, the webbing adjuster 90 maintains its position relative to the webbing 52 to maintain a relatively constant length of the shoulder portion S of the webbing 52 during loading of the webbing 52.

According to other exemplary embodiments, the webbing adjuster 90 may be made from different materials (e.g., metals, composites, other plastics, combinations thereof, etc.), be made according to other manufacturing methods (e.g., stamping, casting, forging, machining, etc.), be made from multiple assembled pieces, etc. Further, the webbing adjuster may be utilized in other applications, such as other types of motor vehicles.

The webbing adjuster 90 may, for example, advantageously allow the seat belt webbing to extract and retract efficiently without binding during normal vehicle use or operating conditions and maintain the position of the webbing relative to the webbing adjuster during loading (e.g., FMVSS 222 quasi-stating testing). The webbing adjuster 90 may also advantageously have a relatively small size, may be relatively light weight, may function without moving components (i.e., components of the webbing adjuster moving relative to other components of the webbing adjuster), may have an intuitive use and operation, which is relatively simple and cost-effective.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the assemblies as shown in the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A webbing adjuster for a seat belt system having a webbing, the webbing adjuster comprising:
   a main body having a base and a guide portion configured to limit a forward movement of the webbing relative to the base, the base having a passage configured to route the webbing from a front side to a rear side of the base so that both a front side and a back side of the webbing contact the webbing and a frictional force is created between the webbing and the base; and
   a lower guide member connected to the main body and configured to limit the forward movement of the webbing;
   wherein when the webbing is not under load, the webbing adjuster is configured to be moveable relative to the webbing;
   wherein when the webbing is under load, the frictional force between the base and the webbing is sufficient to secure the webbing to maintain a relative position between the webbing adjuster and the webbing.

2. The webbing adjuster of claim 1, wherein the base includes a first member spaced apart from a second member defining the passage.

3. The webbing adjuster of claim 2, wherein the first member includes a plurality of grooves located on the front side of the base.

4. The webbing adjuster of claim 2, wherein the second member includes a plurality of projections located on the rear side of the base.

5. The webbing adjuster of claim 1, further comprising an upper guide member connected to the body and configured to route the webbing from the rear side to the front side of the base.

6. The webbing adjuster of claim 5, wherein the upper guide member is configured to limit a rearward movement of the webbing.

7. The webbing adjuster of claim 1, wherein the lower guide member is configured at an angle relative to the base.

8. The webbing adjuster of claim 7, wherein the angle is a forward oblique angle.

9. A seat belt assembly for restraining an occupant of a vehicle, the seat belt assembly comprising:
a webbing; and
a webbing adjuster coupled only to the webbing, the webbing adjuster including a main body having a base portion and a guide portion, the base portion having a passage configured to route the webbing from a rear side to a front side of the base; and
wherein when the webbing is not under load, the webbing adjuster is configured to be moveable relative to the webbing;
wherein when the webbing is under load, a frictional force between the base and the webbing is sufficient to secure the webbing to maintain a relative position between the webbing adjuster and the webbing.

10. The seat belt assembly of claim 9,
wherein the base portion includes a first surface that engages a front side of the webbing, wherein the first surface has a first edge that engages the front side of the webbing at a first bend in the webbing;
wherein the base portion includes a second surface that engages a back side of the webbing, the second surface having a second edge that engages the back side of the webbing at a second bend in the webbing, wherein the first and second surfaces are configured so that the second bend of the webbing is in a different direction than the first bend of the webbing;
wherein the webbing adjuster is configured so that when the webbing adjuster is in a first position a frictional force between the webbing and the base portion is sufficient to prevent relative movement between the webbing adjuster and the webbing and to permit the occupant to manually change the position of the webbing adjuster by sliding the webbing adjuster along the webbing to thereby change the relative position of the webbing and the webbing adjuster;
wherein the webbing adjuster is configured to move into a second position when the occupant moves forward relative to a seat of the vehicle, wherein in the second position the webbing adjuster is rotated relative to the first position of the webbing adjuster; and
wherein the second surface includes a third edge, and wherein when the webbing adjuster is in the second position the third edge engages the back side of the webbing at a third bend in the webbing so that in the second position a frictional force between the webbing and the base portion is greater than the frictional force between the webbing and the base portion when the webbing adjuster is in the first position.

11. The system of claim 9, wherein the first and second surfaces are not parallel.

12. The system of claim 9, wherein the webbing adjuster further comprises:
two side walls;
a first cross member including the first surface;
a second cross member including the second surface; and
a front wall;
wherein each of the first cross member, the second cross member, and the front wall are connected to each of the two side walls.

13. The system of claim 12, wherein the side walls, the first cross member, the second cross member, and the front wall are integrally formed.

14. The system of claim 12, wherein the height adjuster further comprises:
a top passage formed between the first cross member and the front wall;
a rear passage formed between the first cross member and the second cross member; and
a bottom passage formed between the second cross member and the front wall.

15. The system of claim 14, wherein, in the first position, the webbing adjuster is configured so that the webbing passes through the rear passage and engages the first edge of the first cross member, passes between the second cross member and the front wall and engages the second edge of the second cross member, and passes through the bottom passage.

16. A webbing adjuster for a seat belt webbing, comprising:
a base including first and second surfaces configured to engage the webbing, wherein the first and second surfaces are positioned so that the first and second surfaces do not engage the webbing at the same location;
wherein the first surface engages a front side of the webbing to create a first bend in the webbing;
wherein the second surface engages a back side of the webbing to create a second bend in the webbing, wherein the first and second surfaces are configured so that the second bend of the webbing is in a different direction than the first bend of the webbing; and
wherein, when the webbing is under load, a frictional force between the first and second surfaces and the webbing is sufficient to secure the webbing to maintain a relative position between the webbing adjuster and the webbing.

17. The webbing adjuster of claim 16,
wherein the webbing adjuster is configured so that when the webbing adjuster is in a first position a frictional force between the webbing and the first and second surfaces is sufficient to prevent relative movement between the webbing adjuster and the webbing and to permit an occupant to manually change the position of the webbing adjuster by sliding the webbing adjuster and changing the relative position between the webbing and the webbing adjuster;
wherein the webbing adjuster is configured to move into a second position when the occupant moves forward relative to the seat, wherein in the second position the webbing adjuster is rotated relative to the first position of the webbing adjuster; and
wherein the second surface of the height adjuster in the second position further engages the back side of the webbing to create a third bend in the webbing so that in the second position a frictional force between the webbing and the webbing adjuster is greater than the frictional force between the webbing and the webbing adjuster when the webbing adjuster is in the first position.

18. The webbing adjuster of claim 16, further comprising:
two side walls;
a first cross member including the first surface;
a second cross member including the second surface; and
a front wall;
wherein each of the first cross member, the second cross member, and the front wall are connected to each of the two side walls.

19. The webbing adjuster of claim 18, wherein the first surface is positioned at a first distance from the front wall and the second surface is positioned at a second distance from the front wall, the first distance being greater than the second distance.

* * * * *